United States Patent
Hanna

Patent Number: 5,456,086
Date of Patent: Oct. 10, 1995

[54] VALVING ARRANGEMENT AND SOLUTION FLOW CONTROL FOR GENERATOR ABSORBER HEAT EXCHANGER (GAX) HEAT PUMP

[75] Inventor: William T. Hanna, Gahanna, Ohio

[73] Assignee: Gas Research Institute, Chicago, Ill.

[21] Appl. No.: 303,189

[22] Filed: Sep. 8, 1994

[51] Int. Cl.$^6$ .................................................. F25B 15/00
[52] U.S. Cl. .............................. 62/101; 62/141; 62/476
[58] Field of Search ........................... 62/101, 103, 105, 62/476, 484, 141

[56] References Cited

U.S. PATENT DOCUMENTS

| | | | |
|---|---|---|---|
| 4,388,812 | 6/1983 | Clark | 62/141 |
| 4,526,009 | 7/1985 | von der Sluys et al. | 62/101 |
| 4,542,629 | 9/1985 | Biermann | 62/476 |
| 4,665,711 | 5/1987 | Page | 62/238.3 |
| 5,016,444 | 5/1991 | Erickson | 62/79 |
| 5,024,063 | 6/1991 | Erickson | 62/101 |
| 5,097,676 | 3/1992 | Erickson | 62/476 |
| 5,218,843 | 6/1993 | Dao | 62/476 |
| 5,255,528 | 10/1993 | Dao | 62/101 |
| 5,271,235 | 12/1993 | Phillips et al. | 62/101 |

*Primary Examiner*—Henry A. Bennett
*Assistant Examiner*—William C. Doerrler
*Attorney, Agent, or Firm*—Dick and Harris

[57] ABSTRACT

A generator absorber heat exchanger (GAX) heat pump, such as may be used for heating and cooling an inhabited space, having a valving arrangement for converting from a GAX cycle operation to a liquid heat exchanger (LHE) cycle operation when the ambient temperature drops below a predetermined ambient temperature, and for returning to GAX cycle operation when the ambient temperature increases above a predetermined ambient temperature.

5 Claims, 7 Drawing Sheets

VALVING ARRANGEMENT AND SOLUTION FLOW CONTROL FOR GENERATOR ABSORBER HEAT EXCHANGER (GAX) HEAT PUMP

FIELD OF THE INVENTION

The invention relates to generator absorber heat exchanger type heat pumps, such as may be used for heating and cooling of inhabited spaces, of the type in which a liquid absorbent solution is circulated through the various components, the absorbent solution having a refrigerant reactant absorbed therein in varying concentrations, depending upon the location of the solution in the system. Such heat pumps are typically fired by natural gas burners, and have lower electrical requirements than other heating and cooling systems, for improved overall energy consumption efficiencies and substantially reduced electrical consumption.

BACKGROUND OF THE INVENTION

Generator-absorber heat exchange (GAX) heat pumps are known in the prior art, as exemplified by the systems disclosed in U.S. Pat. Nos. 5,271,235; 5,097,676; 5,024,063; 5,255,528; 4,542,629; 4,388,812; 5,016,444; and 4,665,711.

However, GAX systems rely upon absorbent-solution heat exchange between the absorber and the generator, with the heat exchange coils in the bodies of the absorber and generator, respectively, and are limited with respect to the temperature ranges in which they can effectively operate. For example, conventionally known GAX systems are effective for cooling (air conditioning) of occupied spaces, and for providing heating, in ambient temperature conditions of down to approximately 20° F. Below this temperature there is no temperature overlap between the absorber and generator. Therefore the GAX process cannot continue and the heat pump must use a simpler, less efficient cycle.

SUMMARY OF THE INVENTION

The present invention is a generator-absorber heat pump, for the heating and cooling of an occupied space, of the type having an absorber for containing a refrigerant absorbing solution and having at least two regions therein operating at different temperatures, a generator for receiving refrigerant rich absorbent solution and having at least two regions therein operating at different temperatures, and, upon application of heat, generating refrigerant vapor from the absorbent solution and returning refrigerant-weak solution to the absorber.

In particular, the generator-absorber heat pump comprises first means for exchanging heat directly from a higher temperature portion of the absorber to a lower temperature portion of the generator, during periods of operation when daily mean ambient temperatures are above a predetermined ambient temperature, when the higher temperature portion of the absorber is at a higher temperature than the lower temperature portion of the generator; second means for exchanging heat between refrigerant bearing solution exiting the absorber and refrigerant-weak solution exiting the generator during periods of operation during ambient temperatures when the higher temperature portion of the absorber is at a lower temperature than the lower temperature portion of the generator, in which the first and second means are operably disposed together as part of a common fluid flow circuit for said solution; and means for redirecting flow of the solution from the first means to the second means, when the ambient temperature changes such as to drop below a predetermined ambient temperature, and for redirecting flow of the solution from the second means to the first means, when the ambient temperature changes so as to rise above a predetermined ambient temperature.

The first means preferably comprises a generator-absorber heat exchanger, and the second means preferably comprises a liquid heat exchanger.

The means for redirecting flow preferably comprises at least one valve member operably disposed so as to be capable of directing solution flow from the absorber to either the liquid heat exchanger and then to the lowest temperature region of the generator or directly to a higher temperature portion of the generator; means for actuating the at least one valve member in response to changes in ambient temperature corresponding to when the ambient temperature changes such as to drop below a first predetermined ambient temperature, and when the ambient temperature changes so as to rise above a second predetermined ambient temperature.

The present invention also comprises a method for operation of a generator absorber heat exchange heat pump, for the heating and cooling of an occupied space, of the type having an absorber for containing a refrigerant absorbing solution and having at least two regions therein operating at different temperatures, a generator for receiving refrigerant rich absorbent solution and having at least two regions therein operating at different temperatures, and, upon application of heat, generating refrigerant vapor from the absorbent solution and returning refrigerant-weak solution to the absorber. In particular, the method comprises the steps of:

a) heating a refrigerant rich absorbent solution in the generator, to produce at least refrigerant vapor, and hot refrigerant weak absorbent solution;

b) passing the hot refrigerant weak absorbent solution through a generator heat exchange means to release heat from the hot refrigerant weak absorbent solution to a relatively cooler portion of the generator;

c) directing the refrigerant vapor to a condenser to condense the vapor to refrigerant liquid;

d) directing the refrigerant liquid to an expansion means and an evaporator to expand the refrigerant liquid and change it to vapor;

e) directing the refrigerant-weak absorbent solution to the absorber;

f) directing the refrigerant vapor to the absorber, to be absorbed into the refrigerant weak absorbent solution, to produce hot, refrigerant rich absorbent solution;

g) directing all of the refrigerant rich absorbent solution through an absorber heat exchange means operably disposed in the absorber;

h) directing a portion of the refrigerant rich absorbent solution directly to a relatively cooler portion of the generator;

i) directing another portion of the refrigerant rich absorbent solution through a generator/absorber heat exchange means operably disposed in the absorber, for enabling heat transfer from the absorber to the refrigerant rich absorbent solution;

j) directing the another portion of the refrigerant rich absorbent solution from the generator absorber heat exchange means directly to the generator during periods of operation when ambient temperatures are above a predetermined ambient temperature, when the higher temperature portion of the absorber is at a higher temperature than the lower temperature portion of the generator;

k) directing the another portion of the refrigerant rich absorbent solution to a liquid heat exchange means, through which the refrigerant weak absorbent solution from the generator passes, for enabling the refrigerant rich absorbent solution to pick up heat from the refrigerant weak absorbent solution, during periods of operation during ambient temperatures when the higher temperature portion of the absorber is at a lower temperature than the lower temperature portion of the generator;

l) utilizing a portion of the heat released when the refrigerant is absorbed by the absorbent solution for operation of a hydronic heating and cooling circuit for the occupied space;

m) utilizing the heat released by the condensation of refrigerant vapor for operation of a hydronic heating and cooling circuit for the occupied space;

n) utilizing a portion of the cooling obtained through heat absorption by the refrigerant in the evaporator for operation of the hydronic heating and cooling circuit for the occupied space.

DETAILED DESCRIPTION OF THE DRAWINGS

While this invention is susceptible of embodiment in many different forms, there is shown in the drawings and will be described herein in detail, a single preferred embodiment, with the understanding that the present disclosure is to be considered as an exemplification of the principles of the invention and is not intended to limit the invention to the embodiment illustrated.

Figure 1:
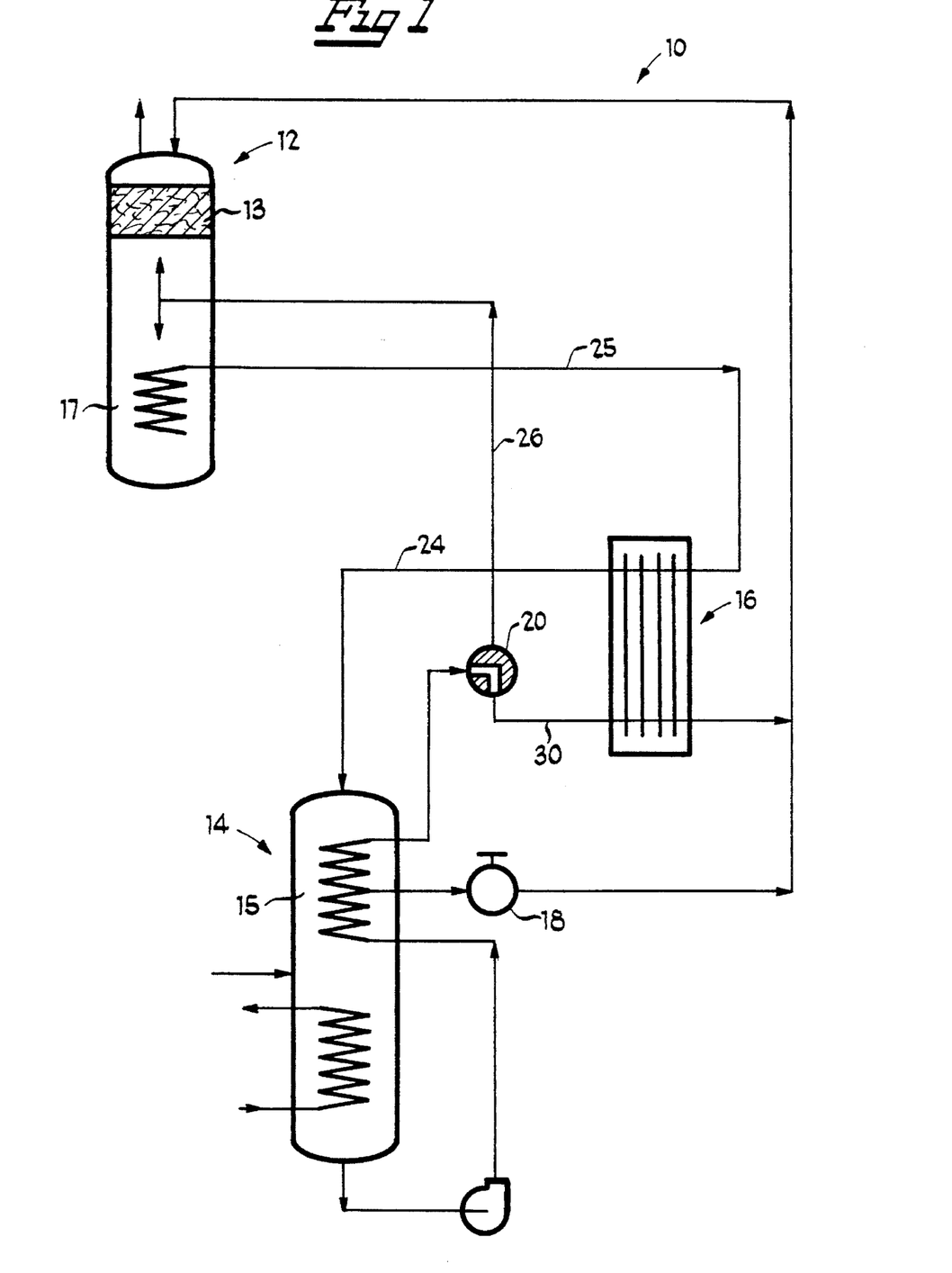
FIG. 1 is a schematic diagram of the mechanical system of the present invention, indicating the valving arrangement for shifting from one cycle operation to another cycle operation.

FIG. 1 shows a preferred mechanical layout, in schematic form, of a GAX heat pump system 10 according to the present invention. System 10 will utilize, preferably, as a solvent, ammonia/water solution, which may or may not have added to it such compounds as chromates and/or silicates or other known, beneficial additives. The refrigerant fluid, which is to be absorbed by and desorbed from the ammonia/water solution, will be ammonia, some concentration of which will always be present in the water, at any point in the generator-absorber circuit.

System 10 includes generator 12, absorber 14, liquid heat exchanger 16, flow control valve 18 and flow control valve 20. Generator 12 may also including an analyzing section (also called an adiabatic rectifier) 13, the purpose of which is to facilitate the intermingling of ammonia vapor with ammonia saturated absorbent solution, to help maintain the purity (ammonia content) of the refrigerant vapor coming from the generator. Also connected into system 10, but not shown in FIG. 1, would be the fluid circuits which would be used for the actual delivery of heating or cooling into the inhabited space, as well as the outdoor circuit for performing any heat exchange with the ambient environment. These indoor and outdoor circuits are shown schematically and explained with respect to FIGS. 2–4. For example, heat exchange coil 41, which passes through the lower portion of absorber 14, may lead to and from a hydronic coil 38 in an air-cooled circuit. Also leading into absorber 14 is an inlet directing the flow of ammonia vapor from an evaporator (as will be discussed hereinafter).

The flow of liquid and/or vapor through system 10 is indicated by the arrowheads.

A generator absorber heat exchange heat pump is appropriate and efficient for cooling (air conditioning) operations, and for heating operations in regimes in which there is temperature overlap between the ammonia vapor generation and ammonia absorption processes. Accordingly, operation of the system 10 as a generator absorber heat exchange (GAX) heat pump is appropriate generally for temperatures of about 20° F. or more. Below that approximate temperature, the generator absorber heat exchanger, in a system such as illustrated, is incapable of generating ammonia vapor.

In order to permit effective operations in ambient temperatures below approximately 20° F., a liquid heat exchanger (LHE) 16, as schematically illustrated in FIG. 1, is employed in order to provide heat recovery between generator 12 and absorber 14. In order to reduce the amount of cycling of the system from GAX to LHE and back, switchovers will be based upon the up or down movement of the ambient temperature which is sensed by ambient temperature sensors which are connected to a suitably programmed controller.

Referring to FIG. 1, the flow of liquid/vapor during the two modes of operation is as follows. During GAX heating or cooling, flow control valve 20 is switched, so that liquid and vapor are directed from absorber 14 into generator 12, bypassing heat exchanger 16. At the same time, flow control valve 18 is partially open, directing a portion of ammonia bearing solution to the top of generator 12, for the purposes described later with respect to the analyzing section 13. When operating in the GAX mode, since there is no counterflow to the flow of weak solution returning through heat exchanger 16 through line 24 to absorber 14, so no significant heat exchange can take place in heat exchanger 16. This is desirable because if the liquid heat exchanger 16 were to be utilized during GAX operations, the coefficient of performance for the system 10 would suffer.

When the ambient temperature drops, for example, to approximately 20° F., a suitably programmed control device (not shown, which are known in the prior art), such as a microprocessor, affixed to suitably located temperature sensors, will actuate flow control valve 20, cutting off the direct flow from absorber 14 through line 26, and instead directing the flow of liquid solution through line 30 into heat exchanger 16. In addition, flow control valve 18 is closed, so that all of the liquid coming from absorber 14 is directed through LHE 16 to the top of generator 12 during LHE operations.

System 10 also includes such necessary other valving and pumps (not shown) as may be required to achieve the necessary circulation of the water and/or ammonia liquid solutions. The provision and sizing of such components are available through engineering techniques known in the prior art.

In prior art systems, the GAX portion of the heat pump system will be a completely closed fluid circuit, for example with the working solution entering the absorber at a cooler portion region, proceeding upward to a hotter region thereof and picking up heat, then exiting the absorber, to a hot portion of the generator, the solution losing heat to the generator and rising to a cooler portion of the generator, and pumped as necessary for return to the absorber. If any liquid heat exchange occurred, it would be between the piping of the strong solution entering the generator, and the weak solution exiting the generator, both sets of piping being on separate circuits from the GAX circuit.

In the present invention, as can be seen from FIG. 1, the absorber heat exchanger (AHE) coil 11 (in which the strong solution headed for the generator picks up additional heat from a hotter portion of the absorber itself), the generator absorber heat exchanger coil (GAX) 15, the liquid heat exchanger (LHE) 16, and the generator heat exchanger (GHE) 17 (in which the weak solution headed for the absorber loses heat in a cooler part of the generator to the generator itself) are all part of the same fluid circuit. Not only does this configuration lead to a more simplified and potentially more compact overall physical construction, but also is believed to lead to improved thermodynamic efficiency, and a more versatile heat pump system as well.

Figure 2:
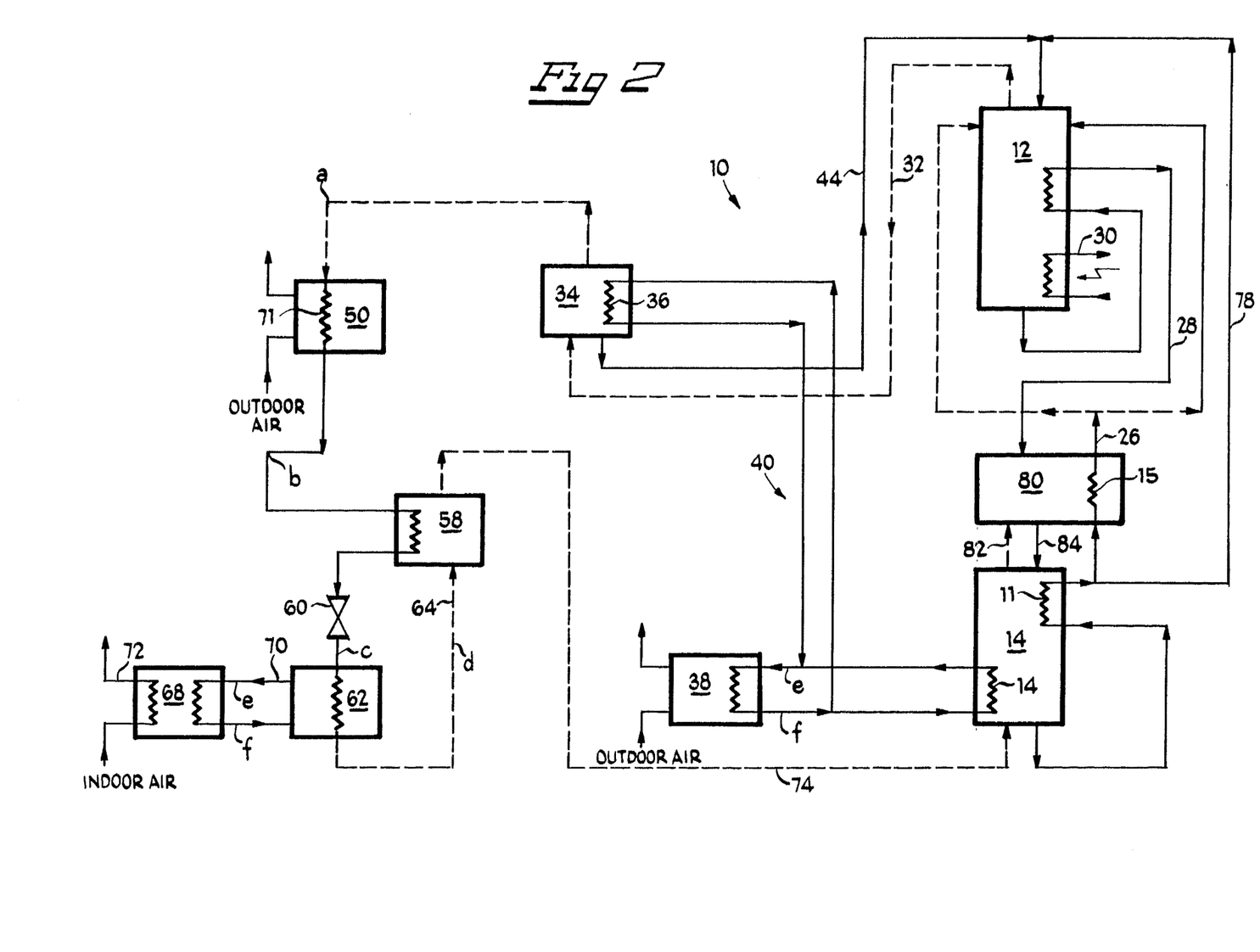
FIG. 2 is a schematic diagram of the GAX cooling cycle configuration of the present invention where outdoor air is used to directly cool the condenser.
Figure 3:
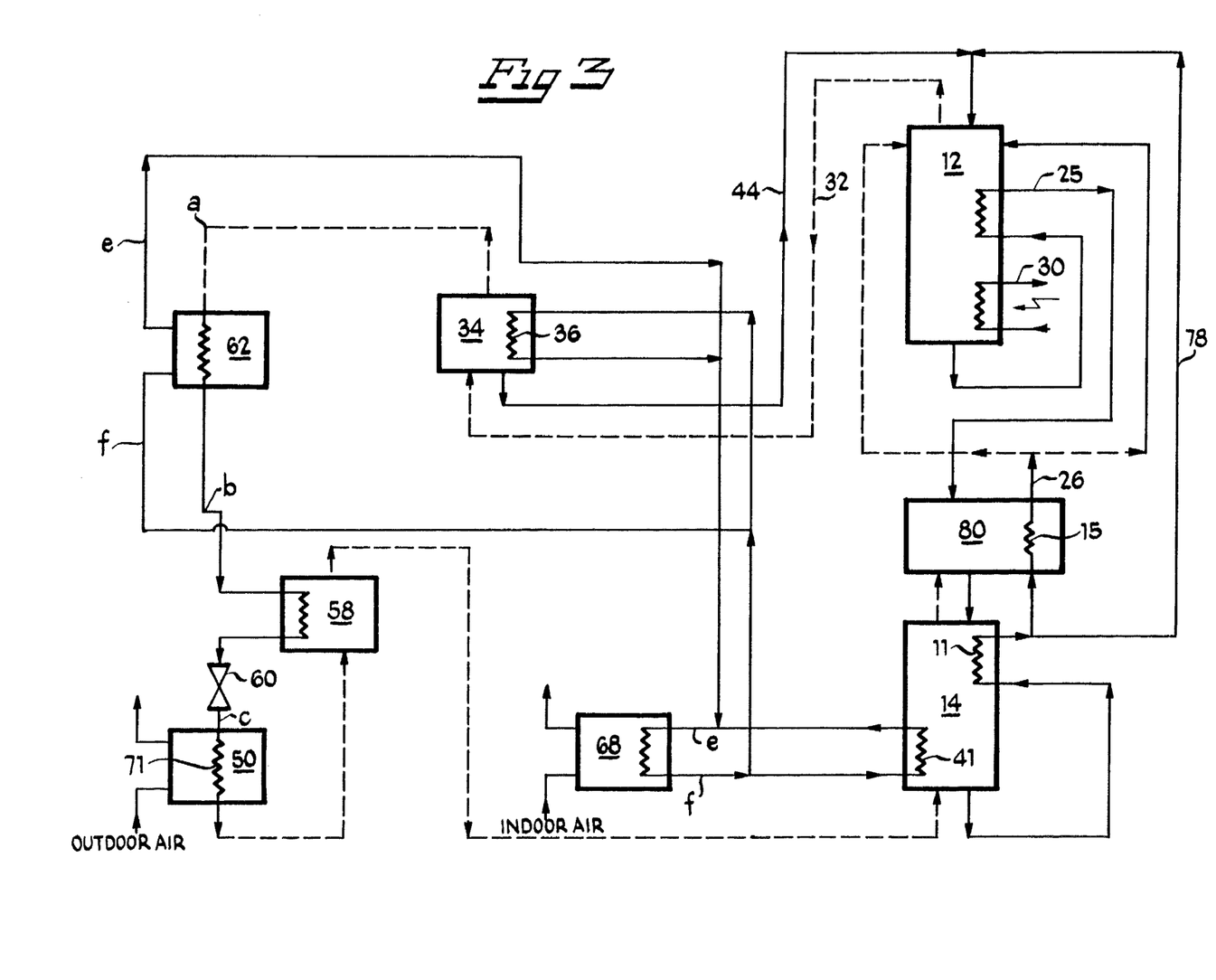
FIG. 3 is a schematic diagram of the GAX heating cycle configuration of the present invention where outdoor air is used to directly heat the evaporator.
Figure 4:
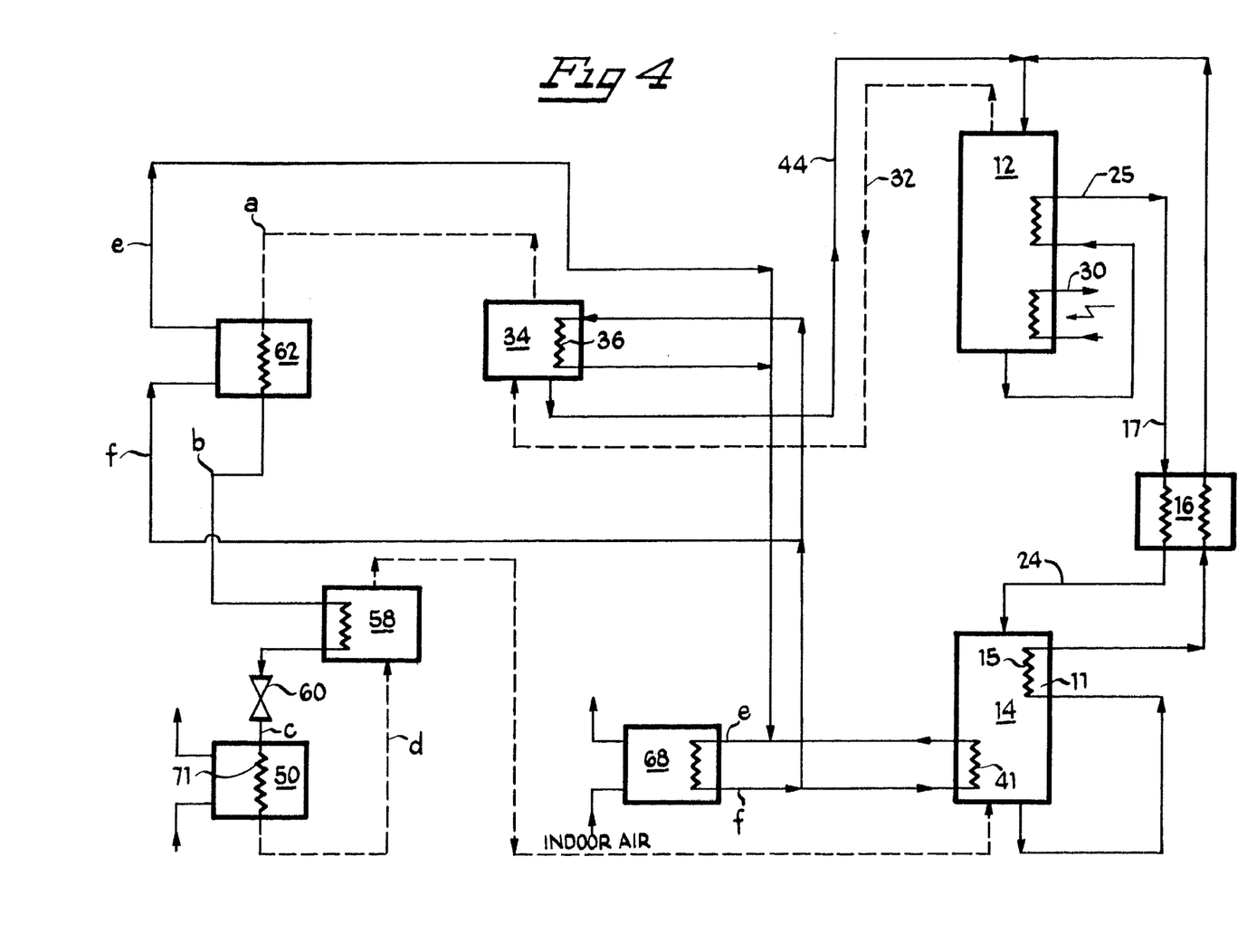
FIG. 4 is a schematic diagram of the LHE heating cycle configuration of the present invention where outdoor air is used to directly heat the evaporator.

Operation of system 10 during each of the principal operating modes, GAX cooling, GAX heating, and LHE heating, are illustrated in cycle schematic drawings in FIGS. 2–4. Where possible, the same reference numerals from FIG. 1 are used in FIGS. 2–4, although due to the operation of some of the cycles, portions of the mechanical components schematically illustrated in FIG. 1 may be in different, separate or multiple locations in FIGS. 2–4, as explained in detail hereinafter.

The GAX cooling cycle is illustrated in FIG. 2.

This cycle illustrates the flow of fluid throughout system 10 when the system is operating as in conjunction with indoor hydronic coils to serve as air conditioning, when the ambient temperature is in the range of 65° F. or greater.

In operation, beginning with generator 12, heat, preferably from a natural gas burner 30, is supplied to the ammonia saturated liquid solution in the generator 12. Ammonia vapor, together with some water vapor, is driven from the liquid solution and proceeds from generator 12 along line 32 to rectifier 34. Rectifier 34 is preferably cooled by heat exchange coil 36, which is part of an outdoor hydronic coil loop 40. Outdoor hydronic loop 40 also circulates to a air heat exchanger 38, as well as a heat exchange coil 41 in absorber 14. The ammonia vapor, being cooled in rectifier 34, has some of the water and ammonia vapors condensed out of it, the liquid (reflux) being returned to generator 12 along line 44. The purified ammonia vapor proceeds to condenser 50, which is illustrated in FIG. 2, as being an air-cooled condenser. The ammonia liquid is then passed through a heat exchange process in precooler 58, the operation of which will be described shortly. After condensing and possibly subcooling, the liquid ammonia is expanded, such as through nozzle 60, so as to lower its pressure and temperature. A portion of the liquid ammonia turns to vapor in evaporator 62 and proceeds as vapor to precooler 58. The remaining cooled, low-pressure ammonia liquid is also directed to precooler 58 with the vapor where most/all of it is evaporated using heat in the hot liquid from the condenser.

Air conditioning of the occupied space is provided by indoor hydronic heat exchange coil 68 which may comprise two stages. A water-to-ammonia heat transfer loop 70 transfers heat from the water via loop 70 to the ammonia in evaporator 62. The hot household air is then passed by air coil 68 and loses heat to water loop 70 to provide the cooled air for the occupied space.

After passing through the precooler 58, all of the ammonia liquid has been expanded into vapor, which returns along line 74 to absorber 14, where the ammonia is absorbed into the ammonia/water solution, releasing heat in the process. A portion of the ammonia-bearing solution is preheated in a heat exchanger (an absorber heat exchanger) 11 before being directed to the vapor generator 12. A portion of the solution, on the order of 20% by volume, is directed to the upper levels of generator 12 via line 78. This portion of the solution is used to provide additional ammonia solution for enhancing the purity of the departing vapor leaving generator 12. The other portion of the solution from absorber 14 is passed through the generator absorber heat exchanger 80 which, although illustrated as a separated component in FIG. 2, mechanically may occupy a portion of the same containment as absorber heat exchanger 14. The generator absorber heat exchanger 80 receives liquid solution from generator 12, via line 25 and ammonia vapor from absorber heat exchanger 14 via line 82. The vapor begins to be absorbed into the solution in generator absorber heat exchanger 80 and returns to the absorber via line 84, heat being picked up by the solution passing through generator absorber heat exchanger coil 15 via line 26.

The heat exchange in the GAX cycle between generator 12 and absorber 14 is as follows: weak solution from a lower temperature section of generator 12 leaves generator 12 by line 25 and enters GAX absorber 80 at a location where the absorber temperature is lower than the temperature of the liquid solution from generator 12. Although generator absorber heat exchanger 80 is schematically shown as a separate cycle position in FIG. 2 (and FIGS. 3 and 4), in the mechanical structure, GAX 80 will be positioned in an upper (i.e., hotter) region in absorber 14. Solution from absorber 14, picks up heat via coil 11, and then picks up additional heat via coil 15, from the solution from generator 12, in GAX 80.

If the ambient temperature is sufficiently low, that is, greater than 20° F., but less than the temperature at which cooling is desired, greater than 70° F., then system 10 may be used as a generator absorber heat pump. The generator absorber heat pump cycle is illustrated in FIG. 3. Again, mechanical components identified in FIG. 1, where appropriate, are identified by similar reference numerals with respect to FIG. 3. In addition, cycle elements similar to those operating during the generator absorber heat exchanger cooling cycle of FIG. 2, are identified by like numerals in FIG. 3. Heat is applied to generator 12 via heat exchange 30, preferably from a natural gas burner. Generator 12 receives ammonia-bearing solution and some vapor (ammonia and water) from absorber 14 via line 26 which passes through generator absorber heat exchanger 80. Ammonia vapor, with some water vapor, is generated which leaves generator 12 by line 32, for rectifier 34. Rectifier 34 is cooled by a heat exchange coil 36 which, unlike the cycle of FIG. 2, is part of an indoor hydronic circuit, rather than an outdoor-running hydronic circuit. The shifting of the cooling of the rectifier and absorber 41 from an outdoor circuit of FIG. 2 to an indoor circuit of FIG. 3 is a matter of appropriate valving between the indoor and outdoor hydronic circuits, and may be accomplished through known valving techniques. Rectifier coil 36 is connected in fluid communication with air heat exchanger 68, in parallel with absorber heat exchange coil 41 in absorber 14. After the ammonia vapor has been rectified (i.e., purified), in rectifier 34, it is piped via appropriate valving to condenser 62. Unlike condenser 50 in the cycle of FIG. 2, condenser 62 is hydronically cooled, and connected in parallel in the same cooling circuit of rectifier 34 and heat absorber coil 41. Note that in the discussion of FIGS. 2, 3 and 4, there is a switching of the function of components 50 and 62. Component 50 is always an outdoor air to refrigerant heat exchanger. In the air conditioning mode shown in FIG. 2, component 50 functions as the condenser, where it is cooled by the outdoor air. In the heat pumping modes shown in FIGS. 3 and 4, component 50 functions as the evaporator and is heated by the outdoor air.

Conversely, component 62 is always a refrigerant to hydronic fluid heat exchanger. In the air conditioning mode shown in FIG. 2, component 62 acts as the evaporator and is heated by the hydronic loop, which is heated, in turn, by the indoor air. In the heating modes shown in FIGS. 3 and 4, component 62 functions as the condenser, being cooled by the indoor air through the hydronic loop and component 38.

Refrigerant valves are required at points a, b, c and d and hydronic valves are required at points e and f shown in FIGS. 2–4.

From condenser 62, the liquid ammonia proceeds through precooler 58, where the liquid ammonia gives off further heat to the liquid and ammonia vapor coming from evaporator 50. The liquid ammonia passes through expander nozzle 60 to drop to a lower pressure and temperature before entering into evaporator 50. Evaporator 50, takes in the heat from the ambient via outdoor heat exchange coil 71. The vapor and ammonia liquid from evaporator 50 are then passed through precooler 58 and then back to absorber 14. The circulation of ammonia bearing solution between absorber 14 and generator 12 is substantially identical to the flow described with respect to FIG. 2. Heating of the occupied space is accomplished by the cycle of FIG. 3 through the exchange of heat between the indoor air and the indoor hydronic loop at heat exchange coil 68. Indoor air is passed by the hydronic coil of exchanger 68 and heated, the hydronic coil receiving its heat from condenser 62, absorber 14 as well as rectifier 34.

Once the ambient temperature drops below approximately 20 degrees Fahrenheit, however, the thermodynamics of the generator absorber system 10 of FIGS. 2 and 3, are such that generator/absorber heat exchanger 80 will no longer be able to produce ammonia vapor.

The orientation of valves 18 and 20 (FIG. 1), which is the same for both the cooling cycle of FIG. 2 and the heating cycle of FIG. 3, is altered, when the ambient temperature has dropped below 20 degrees Fahrenheit, to convert system 10 to a liquid heat exchange such that there is a counter flow through a liquid heat exchanger 16 producing a solution to solution exchange of heat.

The operation of the liquid heat exchanger (LHE) heating cycle, shown in FIG. 4, is as follows. Heat is added to the generator at heat exchange coil 30 by, again, preferably, a natural gas burner. The ammonia-bearing water solution in generator 12 is heated to such a point that ammonia vapor is given off and directed to a rectifier 34 via line 32. Also accompanying the ammonia vapor will be a certain amount of water vapor which is returned to generator 12 via line 44. After rectification, the ammonia vapor is conducted to condenser 62, which is cooled by a hydronic cooling circuit 35, which is also part of the hydronic circuit which takes heat from rectifier 34 through coil 36 and which also takes heat from absorber 14 through coil 41 and which delivers the heat to the occupied space via heat exchanger 68 which transfers the heat from the hydronic solution coil 39 to the indoor air. After condensation, the ammonia solution passes through precooler 58 and expander 60 in the manner previously described. The liquid is heated in evaporator 50, by heat obtained from the outside air through coil 71. After the partially evaporated ammonia has passed through the precooler to pick up further heat from the descending liquid ammonia, the ammonia vapor is returned to absorber 14 to be absorbed into the solution in absorber 14. The ammonia saturated solution is circulated in a heat exchange manner through the upper part of absorber 14 by coils 11 and 15 so as to return some of the heat to absorber 14 in the heating circuit, however, when the saturated solution is being returned to the top of generator 12, the saturated hot solution passes through liquid heat exchanger 16 and imparts heat to the weak solvent solution returning from generator 12 via line 25 to line 24.

Note that by closing valve 18 (FIG. 1), the function of both coils 15 and 11 are applied to useful heat recovery in the cycle. Thus the use of valves 18 and 20 allows the surface of coil 15 (the GAX coil) to be active and useful in all 3 modes of operation.

It is believed that an enhanced, more thermodynamically efficient system for heating and cooling of occupied space, employing water-ammonia absorbent solution cycles for the indirect heating of the occupied space, with heat exchange between the ammonia water system and a hydronic coil which directly heats the occupied space (as is typically dictated by local housing code or regulation), is achieved through the use of the advantageous valving in and out between the generator absorber heat exchanger heating and cooling during summer and warmer winter weather and liquid heat exchanger heat pumping system during colder winter weather.

Control of the valving from GAX to LHE operations will be accomplished by a suitably programmed computer or microprocessor, connected to the thermostat of the occupied space, as well as temperature sensors located inside and outside. It is presently contemplated that, when the temperature is rising the LHE cycle should be employed up to ambient temperatures of 23° F. When the temperatures are falling, the GAX cycles should be employed down to ambient temperatures of 20° F. It is believed that, properly controlled, the turnover from GAX to LHE cycle should only occur at most once a day during parts of the winter.

During periods of extreme cold (<0° F.), the gas burner will be required to overfire, running continuously, cycling between a predetermined high setting, and a nominal setting. An overfiring rate of 50% is believed to enable a heat pump system, as described, to provide adequate heating down to −20° F., without assistance, and a majority of the heating load down to −30° F.—so no supplementary heating system should be needed.

Estimated cycle coefficients of performance (COP) for such a combined LHE-GAX heat pump system as described herein range from greater than 1.35 (LHE operation at −30° F.), to 1.5–1.6 (LHE operation at 0° F.) to 2.0 (GAX operation at 65° F.), all heating operations, and then in GAX cooling operations, the range is from 1.2 down to 0.85 at ambient temperature from 75° F. to 115° F.

Figure 5:
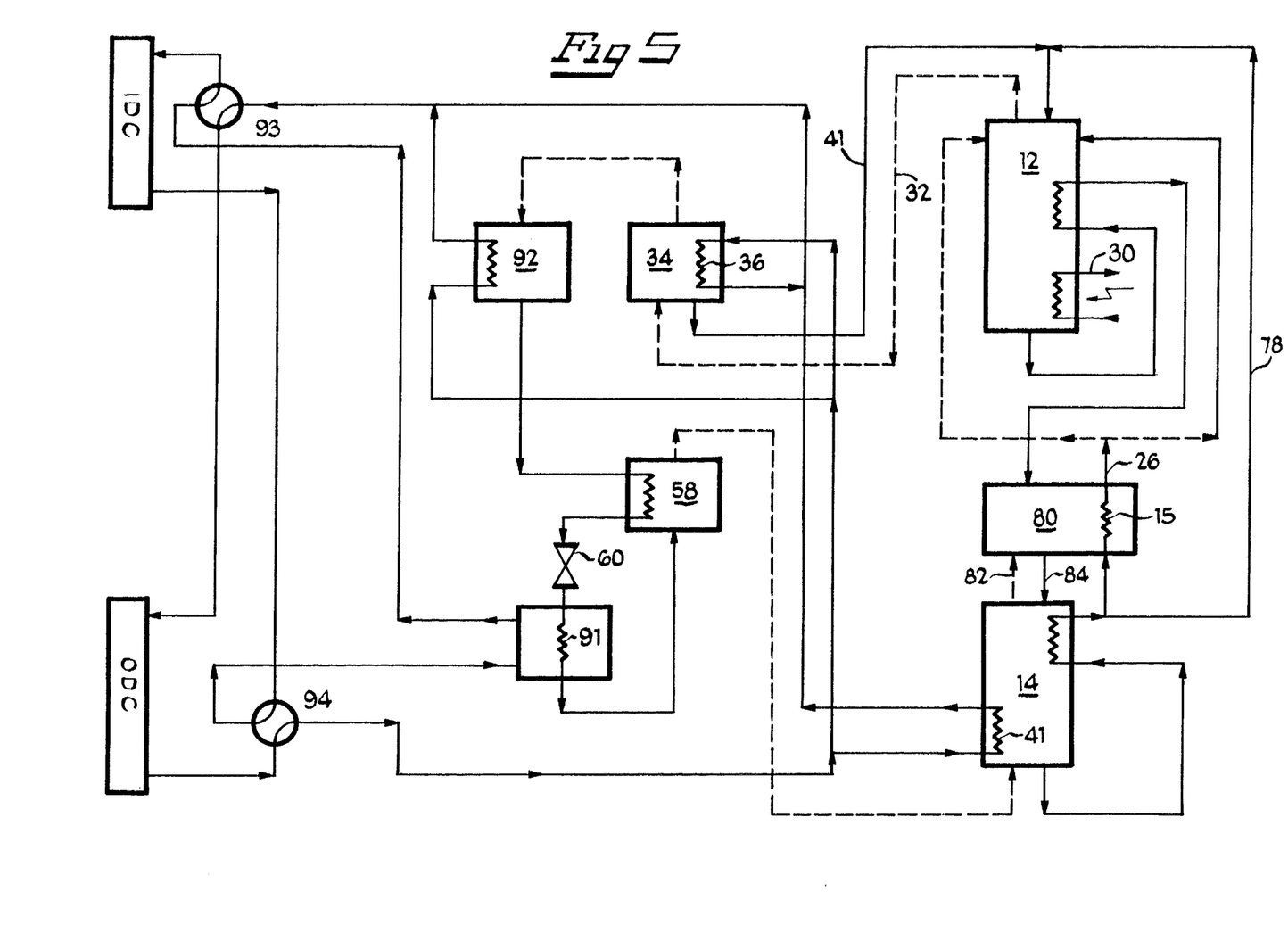
FIG. 5 is a schematic diagram of the GAX cooling cycle configuration using two full hydronic loops to couple the heat pump to indoor and outdoor air.
Figure 6:
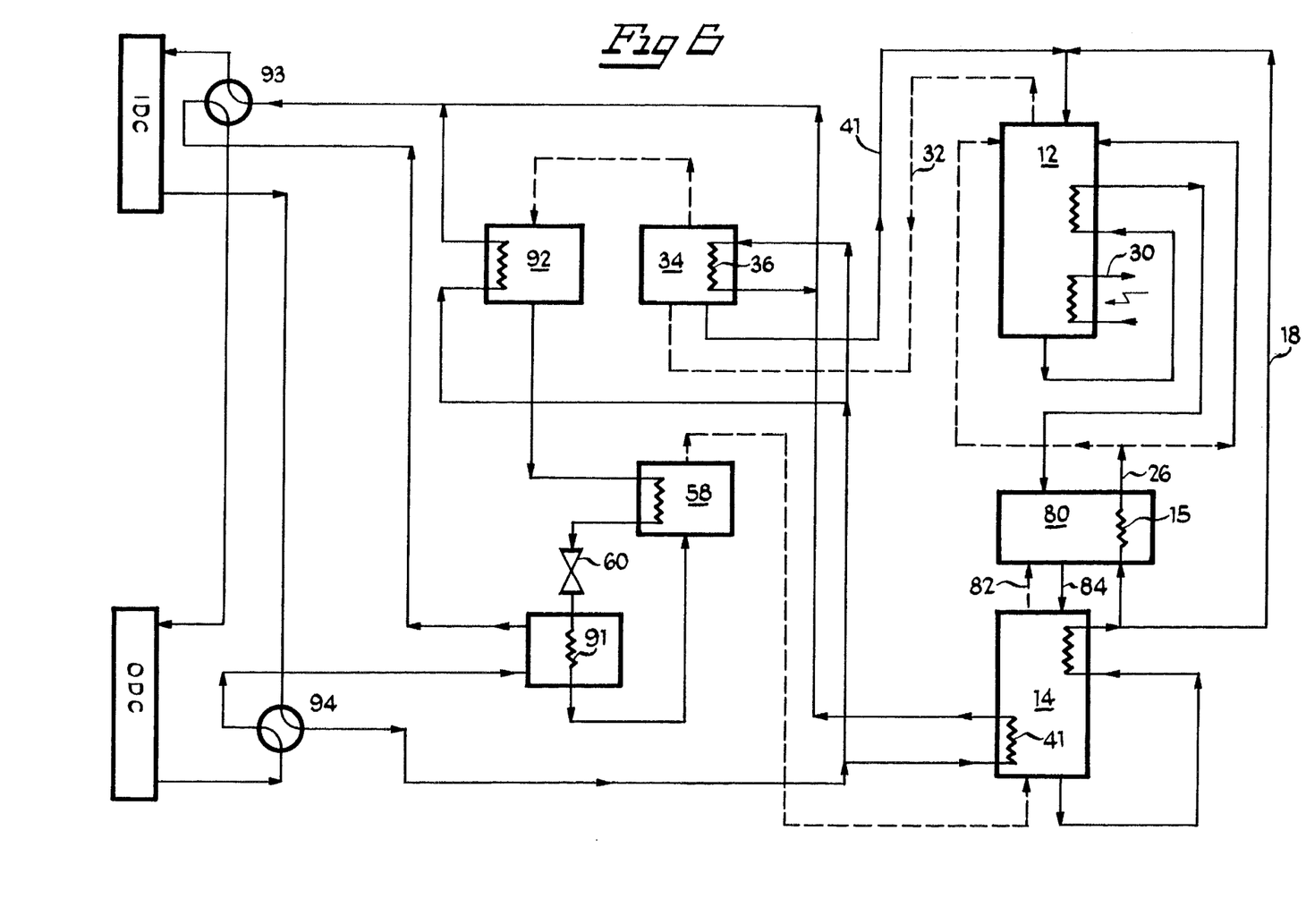
FIG. 6 is a schematic diagram of the GAX heating cycle configuration using two full hydronic loops to couple the heat pump to indoor and outdoor air.
Figure 7:
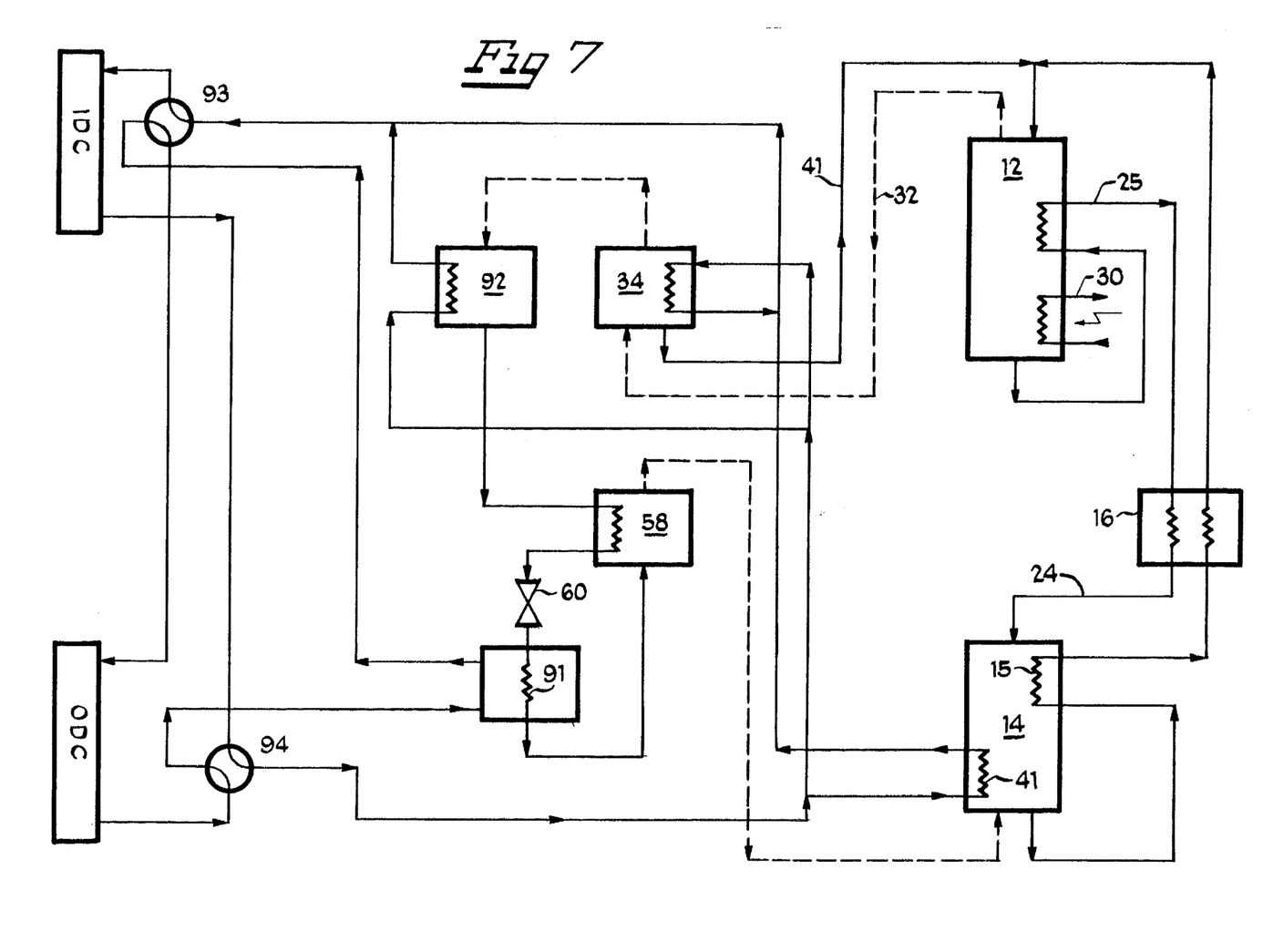
FIG. 7 is a schematic diagram of the LHE heating cycle configuration using two full hydronic loops to couple the heat pump to indoor and outdoor air.

FIGS. 5, 6 and 7 show the three modes of GAX heat pump operation for 1) air conditioning (FIG. 5); 2) warm heat pumping >20° F. (FIG. 6); and 3) cold heat puming <20° F. (FIG. 7) for a system where there is one dedicated evaporator 91 and one dedicated condenser 92. Switching from heating to cooling is accomplished by the paired 4-port hydronic valves 93 and 94 acting together. These systems are not quite as efficient as those shown in FIGS. 2–4 but they do not require refrigerant switching valves (not shown, but commonly understood) to change from heating to cooling.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

I claim:

1. A generator-absorber heat pump, for the heating and cooling of an occupied space, of the type having an absorber for containing a refrigerant absorbing solution and having at least two regions therein operating at different temperatures, a generator for receiving refrigerant rich absorbent solution and having at least two regions therein operating at different temperatures, and, upon application of heat, generating refrigerant vapor from the absorbent solution and returning refrigerant-weak solution to the absorber, the generator-absorber heat pump comprising:

first means for exchanging heat between from a higher temperature portion of the absorber to a lower temperature portion of the generator, during periods of operation when ambient temperatures are above a predetermined ambient temperature, when the higher temperature portion of the absorber is at a higher temperature than the lower temperature portion of the generator;

second means for exchanging heat between refrigerant bearing solution exiting the absorber and refrigerant-weak solution exiting the generator during periods of operation during ambient temperatures when the higher temperature portion of the absorber is at a lower temperature than the lower temperature portion of the generator, said first and second means being operably disposed together as part of a common fluid flow circuit for said solution; and means for redirecting flow of the solution from the first means to the second means, when the ambient temperature changes such as to drop below a first predetermined ambient temperature, and for redirecting flow of the solution from the second means to the first means, when the ambient temperature changes so as to rise above a second predetermined ambient temperature.

2. The generator-absorber heat pump according to claim 1, wherein the first means comprises:

a generator-absorber heat exchanger.

3. The generator-absorber heat pump according to claim 2, wherein the second means comprises:

a liquid heat exchanger.

4. The generator-absorber heat pump according to claim 3, wherein the means for redirecting flow comprises:

at least one valve member operably disposed so as to be capable of directing solution flow from the absorber to either the liquid heat exchanger or directly to a higher temperature portion of the generator;

means for actuating the at least one valve member in response to changes in ambient temperature corresponding to when the ambient temperature changes such as to drop below a first predetermined ambient temperature, and when the ambient temperature changes so as to rise above a second predetermined ambient temperature.

5. A method for operation of a generator absorber heat pump, for the heating and cooling of an occupied space, of the type having an absorber for containing a refrigerant absorbing solution and having at least two regions therein operating at different temperatures, a generator for receiving refrigerant rich absorbent solution and having at least two regions therein operating at different temperatures, and, upon application of heat, generating refrigerant vapor from the absorbent solution and returning refrigerant-weak solution to the absorber, the method comprising:

a) heating a refrigerant rich absorbent solution in the generator, to produce at least refrigerant vapor, and hot refrigerant weak absorbent solution;

b) passing the hot refrigerant weak absorbent solution through a generator heat exchange means to release heat from the hot refrigerant weak absorbent solution to a relatively cooler portion of the generator;

c) directing the refrigerant vapor to a condenser to condense the vapor to refrigerant liquid;

d) directing the refrigerant liquid to an expansion means and an evaporator to expand the refrigerant liquid and change it to vapor;

e) directing the refrigerant weak absorbent solution to the absorber;

f) directing the refrigerant vapor to the absorber, to be absorbed into the refrigerant weak absorbent solution, to produce hot refrigerant rich absorbent solution;

g) directing a portion of the refrigerant rich absorbent solution through an absorber heat exchange means operably disposed in the absorber, for enabling heat transfer from the absorber to the refrigerant rich absorbent solution;

h) directing the another portion of the refrigerant rich absorbent solution subsequently to a generator absorber heat exchange means for enabling further heat transfer from the absorber to the refrigerant rich absorbent solution;

i) directing the another portion of the refrigerant rich absorbent solution from the generator absorber heat exchange means directly to the generator during periods of operation when ambient temperatures are above a predetermined ambient temperature, when the higher temperature portion of the absorber is at a higher temperature than the lower temperature portion of the generator;

j) directing the another portion of the refrigerant rich absorbent solution to a liquid heat exchange means, through which the refrigerant weak absorbent solution from the generator passes, for enabling the refrigerant rich absorbent solution to pick up heat from the refrigerant weak absorbent solution, during periods of operation during ambient temperatures when the higher temperature portion of the absorber is at a lower temperature than the lower temperature portion of the generator;

k) utilizing a portion of the heat released when the refrigerant is absorbed by the absorbent solution for operation of a hydronic heating and cooling circuit for the occupied space;

l) utilizing a portion of the cooling obtained through heat absorption by the refrigerant in the evaporator for operation of the hydronic heating and cooling circuit for the occupied space.

* * * * *